(No Model.)
W. P. HATCH.
PRUNING IMPLEMENT.
No. 485,793. Patented Nov. 8, 1892.
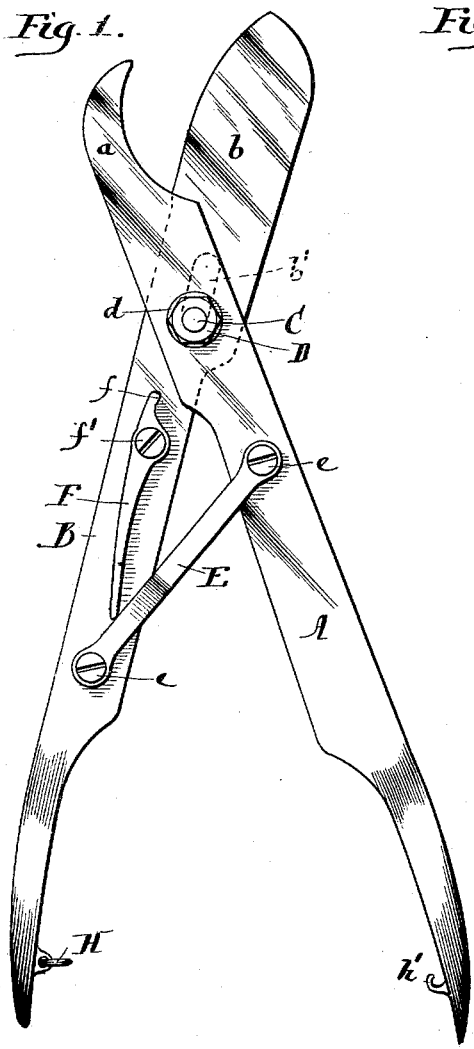
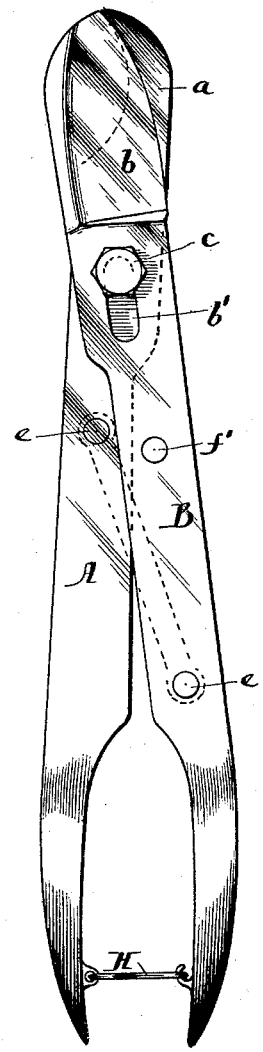
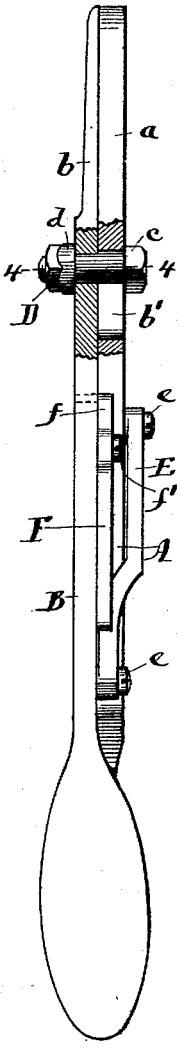
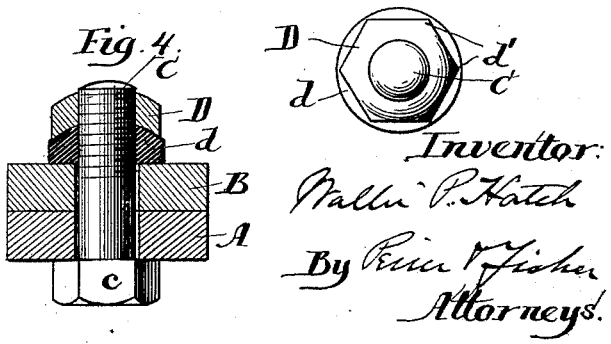
Witnesses
Fred Gerlach
J. B. Carpenter
Inventor
Walter P. Hatch
By Pierce & Fisher
Attorneys
THE NORRIS PETERS CO., PHOTO-LITHO., WASHINGTON, D. C.

UNITED STATES PATENT OFFICE.

WALTER P. HATCH, OF CHICAGO, ILLINOIS.

PRUNING IMPLEMENT.

SPECIFICATION forming part of Letters Patent No. 485,793, dated November 8, 1892.

Application filed August 22, 1891. Serial No. 403,395. (No model.)

*To all whom it may concern:*

Be it known that I, WALTER P. HATCH, residing at Chicago, in the county of Cook and State of Illinois, have invented certain new and useful Improvements in Shears for Pruning and for other Purposes, of which I do declare the following to be a full, clear, and exact description, reference being had to the accompanying drawings, forming part of this specification.

Figure 1 is a view in side elevation of a pair of pruning-shears embodying my invention, the blades of the shears being shown in open position. Fig. 2 is a view in side elevation from the opposite side and showing the blades in closed position. Fig. 3 is an edge view of the shears, parts being broken away adjacent to the pivot-bolt. Fig. 4 is a view in transverse section on line 4 4 of Fig. 3. Fig. 5 is a detail face view of the pivot-bolt, its nut, and washer for connecting the jaws.

A and B denote, respectively, the two sections of my improved shears, one end of each of these sections being conveniently shaped to form suitable handles. The section A is provided with the hook-shaped blade $a$, and the section B is formed with the sharp-edged blade $b$, which is preferably slightly curved upward toward its outer end. The blade or hook $a$ of the section A is shown as having merely a shoulder or edge co-operating with the blade $b$; but, if desired, the blade $a$ might be sharpened to any desired extent without departing from the spirit of the invention. The section A of the shears is formed with a holder to receive the pivot-bolt C, and the section B of the shears is formed with a long slot $b'$, through which also passes this pivot-bolt. The head $c$ of the pivot-bolt C is of sufficient size to prevent the withdrawal of the bolt from the slot $b'$, and upon the threaded end of the bolt C are placed the rubber washer $d$ and the threaded nut D. The nut D is preferably of concavo-convex shape or at least has its under side formed of concave shape for a purpose to be presently stated.

My object in forming one of the sections of the shears with a slot $b'$, through which the pivot-bolt will pass, is to provide not merely the usual pivotal movement of the shear-blades with respect to each other, but to insure, also, that the blades shall have a sliding or longitudinal movement with respect to each other, in order to give a drawing or shear cut to the blades. The sections A and B are united, also, by a link E, that is attached by the pivot pins or screws $e$ with the respective sections. To the section B of the shears is fixed a spring F, this spring being preferably attached to the section B by a screw $f'$ and by a lug $f$, passing into a suitable seat or perforation in the section B. The free end of the spring F bears upon the link E and serves to normally force the sections apart, as seen in Fig. 1.

From the foregoing description it will be seen that if the parts be in the position seen in Fig. 1 of the drawings and the handles of the sections A and B be grasped to bring the sections to the closed position seen in Fig. 2 the compression of the handles would not only serve to effect a pivotal movement of the blades $a$ and $b$ with respect to each other, but a sliding movement of the blades with respect to each other will also occur. This sliding movement in the construction shown is due to the link E, (although such movement might be otherwise produced without departing from the spirit of the invention,) this link E serving as the sections are compressed to force forward the section A and cause the pivot-bolt C to move forward within the slot $b'$ of the section B. As a consequence, the article to be severed, resting upon the blade or foot portion $a$, is forced forward toward the edge of the blade $b$ at the same time that it is pressed against the edge of this blade $b$, and the "shear" or "draw" cut thus resulting serves to much more readily and effectively sever the article than would be possible if the usual pivotal movements of the blades with respect to each other was allowed.

My object in providing the pivot-bolt with a rubber washer $d$ and with a nut D, having a concaved inner face, is to insure against the rotation of the nut D, and thereby avoid the danger of the working of this nut from off the threaded end of the bolt. It will be seen by reference more particularly to Fig. 4 that when the nut D is forced firmly against the rubber washer $d$ it will compress this washer between it and the face of the section A, and as the washer is thus compressed it will be expanded laterally, causing its outer portions to lap over or more or less embed the corners $d'$ of the nut D, and thereby guard this nut against rotation, since the contact of the rubber with the face of the section A will securely hold the washer itself against danger of rotation. Moreover, the rubber washer will serve by its elasticity to hold the blades $a$ and $b$ of the shears in close working contact and compensate for wear incident to long usage.

By preference the handle portions of the section $b$ has a link H connected thereto, this link being formed at its free end with an eye adapted to engage with a hook $h'$ at the end of the section A when the shear-sections are to be held in closed position, as shown in Fig. 2 of the drawings.

Having thus described my invention, what I claim as new, and desire to secure by Letters Patent, is—

In a pair of shears, the combination, with the sections, of a bolt for connecting said sections together, a rubber or equivalent washer, and a nut D, bearing upon said washer, said nut having a concaved inner face and having corners $d'$, whereby when the washer is compressed it will be expanded laterally, causing its outer portions to embed the corners of the nut, and thereby guard it against rotation, substantially as described.

WALTER P. HATCH.

Witnesses:
CHARLES A. GILLESPIE,
CLARENCE W. HATCH.